United States Patent
Sedarat et al.

(10) Patent No.: US 7,443,916 B2
(45) Date of Patent: Oct. 28, 2008

(54) METHOD AND APPARATUS FOR COMMUNICATION IN THE PRESENCE OF IMPULSE NOISE

(75) Inventors: Hossein Sedarat, San Jose, CA (US); Ben Miller, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 706 days.

(21) Appl. No.: 10/721,445

(22) Filed: Nov. 24, 2003

(65) Prior Publication Data

US 2005/0111561 A1    May 26, 2005

(51) Int. Cl.
  H04L 27/28    (2006.01)
  H04B 1/10    (2006.01)
  H03D 1/04    (2006.01)
(52) U.S. Cl. .................... 375/260; 375/254; 375/346
(58) Field of Classification Search .......... 375/147, 375/254, 260, 346, 222; 455/401; 370/436
  See application file for complete search history.

(56) References Cited

U.S. PATENT DOCUMENTS

| | | | | |
|---|---|---|---|---|
| 4,679,227 | A | * | 7/1987 | Hughes-Hartogs ....... 379/93.31 |
| 4,845,466 | A | * | 7/1989 | Hariton et al. .............. 375/257 |
| 5,285,474 | A | | 2/1994 | Chow et al. |
| 5,844,940 | A | * | 12/1998 | Goodson et al. ............ 375/222 |
| 5,867,539 | A | | 2/1999 | Koslov |
| 5,909,178 | A | | 6/1999 | Balch et al. |
| 6,006,083 | A | * | 12/1999 | Tong et al. .................. 455/401 |
| 6,161,209 | A | | 12/2000 | Moher |
| 6,433,819 | B1 | | 8/2002 | Li et al. |
| 6,633,545 | B1 | | 10/2003 | Milbrandt |
| 6,721,394 | B1 | | 4/2004 | Murphy et al. |
| 6,738,418 | B1 | | 5/2004 | Stiscia et al. |
| 6,791,995 | B1 | * | 9/2004 | Azenkot et al. ............. 370/436 |
| 6,859,488 | B2 | * | 2/2005 | Azenkot et al. ............. 375/147 |
| 6,999,507 | B2 | | 2/2006 | Jin |
| 7,035,661 | B1 | | 4/2006 | Yun |
| 7,155,007 | B1 | | 12/2006 | Upton |
| 2002/0044597 | A1 | | 4/2002 | Shively et al. |

(Continued)

FOREIGN PATENT DOCUMENTS

DE    EP 0 377 965    *    7/1989

(Continued)

OTHER PUBLICATIONS

Peter S. Chow, et al., "A Practical Discrete Multitone Transceiver Loading Algorithm for Data Transmission over Spectrally Shaped Channels," *IEEE Trans. On Communications*, vol. 43, No. 2, pp. 773-775, 1995.

(Continued)

*Primary Examiner*—Mohammad Ghayour
*Assistant Examiner*—Lawrence B Williams
(74) *Attorney, Agent, or Firm*—Blakely, Sokoloff, Taylor & Zafman LLP (57) ABSTRACT

A method, system and apparatus for reliable multicarrier communication in the presence of periodic impulsive interference is disclosed. A power level of noise in a signal is determined. An impulse noise in the signal is detected. A gain factor associated with the impulse noise is determined and applied to the noise power of the signal to calculate an equivalent noise power. In one aspect, the equivalent noise power is used to determine a signal-noise-ratio.

45 Claims, 6 Drawing Sheets

U.S. PATENT DOCUMENTS

| | | | |
|---|---|---|---|
| 2003/0043925 A1* | 3/2003 | Stopler et al. | 375/254 |
| 2003/0048368 A1 | 3/2003 | Bosco et al. | |
| 2003/0099286 A1 | 5/2003 | Graziano et al. | |
| 2004/0057502 A1* | 3/2004 | Azenkot et al. | 375/147 |
| 2004/0066865 A1* | 4/2004 | Yousef et al. | 375/346 |
| 2004/0091025 A1* | 5/2004 | Sindhushayana et al. | 375/148 |
| 2005/0047514 A1 | 3/2005 | Bolinth et al. | |
| 2005/0111561 A1 | 5/2005 | Sedarat et al. | |
| 2005/0169357 A1* | 8/2005 | Sedarat | 375/222 |
| 2005/0190825 A1* | 9/2005 | Sedarat | 375/222 |
| 2006/0062379 A1* | 3/2006 | Sedarat et al. | 379/406.01 |
| 2006/0067388 A1* | 3/2006 | Sedarat | 375/219 |
| 2006/0083321 A1* | 4/2006 | Sedarat | 375/260 |
| 2006/0222098 A1* | 10/2006 | Sedarat et al. | 375/260 |
| 2006/0253515 A1* | 11/2006 | Sedarat | 708/446 |

OTHER PUBLICATIONS

Jorge Campello, "Optimal Discrete Bit Loading for Multicarrier Modulation Systems," *IEEE International Symposium on Information Theory*, Aug. 1998, Cambridge, MA, p. 193.

Brian S. Krongold, et al., "Computationally Efficient Optimal Power Allocation Algorithms for Multicarrier Communication Systems," *IEEE Trans. On Communications*, vol. 48, pp. 23-27, Jan. 2000.

Ranjan V. Sonalkar, "An Efficient Bit-Loading Algorithm for DMT Applications," *IEEE Comm. Letters*, vol. 4, pp. 80-82, Mar. 2000.

Ana Garcia Armada, et al., "Multi-User Constant-Energy Bit Loading for M-PSK-Modulated Orthogonal Frequency Division Multiplexing," *IEEE Wireless Communications and Networking Conference (WCNC)*, Orlando, pp. 526-530, Mar. 2002.

Andre Noll Barreto, et al., "Adaptive Bit Loading for Wireless OFDM Systems," *IEEE International Symposium on Personal, Indoor and Mobile Radio Communications*, G-88 to G92, Oct. 2001.

Enzo Baccarelli, et al., Novel Efficient Bit-Loading Algorithms for Peak-Energy-Limited ADSL-Type Multicarrier Systems, *IEEE Trans on Signal Processing*, vol. 50, No. 5, pp. 1237-1247, May 2002.

Franklin, Curt, "How DSL Works," How Stuff Works, http://computer.howstuffworks.com/dsl.htm/printable, printed Nov. 16, 2004.

Sedarat, Hossein, et al., "Impulse Noise Protection for Multi-Carrier Communication Systems", Submitted to IEEE ICASSP (2005).

Sedarat, Hossein, et al., "Multicarrier Bit-Loading in Presence of Biased Gaussian Noise Source", IEEE Consumer Communication and Networking Conference, Jan. 2005.

Fischer, Robert F.H., et al., "A New Loading Algorithm for Discrete Multitone Transmission," IEEE, 1996, pp. 724-728.

Lampe, Lutz H.-J., et al., "Performance Evaluation of Non-Coherent Transmission over Power Lines," 8 pgs.

Henkel, Wener, et al., "Maximizing the Channel Capacity of Multicarrier Transmission by Suitable Adaptation of the Time-Domain Equalizer," IEEE, vol. 48, No. 12, Dec. 2000.

Lashkarian, Navid, et al., "Fast Algorithms for Finite-Length MMSE Equalizers with Application to Discrewte Multitone Systems," IEEE 1999, pp. 2753-3756.

Melsa, Peter J.W., et al., "Impulse Response Shortening for Discrete Multitone Transceivers," IEEE vol. 44, No. 12, Dec. 1996, pp. 1662-1672.

Al-Dhahir, Naofal, et al., "Optimum Finite-Length Equalization for Multicarrier Transceivers," IEEE vol. 44, No. 1, Jan. 1996, pp. 56-64.

Leke, Achankeng, et al., "A Maximum Rate Loading Algorithm for Discrete Multitone Modulation Systems," IEEE 1997, pp. 1514-1518.

Bingham, John A.C., "Multicarrier Modulation for Data Transmission: An Idea Whose Time Has Come," IEEE, May 1990, pp. 5-14.

Arslan, G., et al., "Equalization for Discrete Multitone Transceivers to Maximize Bit Rate," IEEE, vol. 49, No. 12, Dec. 2001, pp. 3123-3135.

Farhang-Boroujeny, Behrouz, et al., "Design Methods for Time-Domain Equalizers in DMT Transceivers," IEEE, vol. 49, No. 3, Mar. 2001, pp. 554-562.

Wyglinski, Alexander M., et al., "An Efficient Bit Allocation for Multicarrier Modulation," IEEE Wireless Communication, Networking Conference, Atlanta, GA, Mar. 2004, 4 pgs.

"Draft Standard," Network and Customer Installation Interfaces-Asymmetric Digital Subscriber Line (ADSL) Metallic Interface, Draft American National Standard for Telecommuncation, Alliance for Telecommuncations Industry Solutions, T1.413-1998.

Milosevic et al., "Simultaneous Multichannel Time Domain Equalizer Design Based on the Maximum Composite Shortening SNR", Dept. of Electrical and Computer Eng., The University of Texas, Austin, Texas, Prior to filing date of current appilcation, pp. 5 total.

Misao Fukuda et al., "A Line Terminating LSI Using Echo Cancelling Method for ISDN Subscriber Loop Transmission", IEEE Journal on Selected Areas in Communications, vol. 6, No. 3, Apr. 1988, pp. 476-483.

Cheng-shing Wu et al., "A Novel Cost-Effective Multi-Path Adaptive Interpolated FIR (IFIR)-Based Echo Canceller", © 2000 IEEE, pp. V-453-V-456.

Ranjan V. Sonalkar et al., "Shannon Capacity of Frequency-Overlapped Digital Subscriber Loop Channels", © 2002 IEEE, pp. 1741-1745.

Ivan A. Perez-Alvarez et al., "A Differential Error Reference Adaptive Echo Canceller for Multilevel PAM Line Codes*" *Work supported by National Project T1C95-0026, © 1996, IEEE, pp. 1707-1710.

Nadeem Ahmed et al., "Optimal Transmit Spectra for Communication in the Presence of Crosstalk and Imperfect Echo Cancellation", Copyright 2001 IEEE, pp. 17-21.

U.S. Appl. No. 10/789,552, Office Action dated Apr. 9, 2007, 10 pages.

U.S. Appl. No. 10/773,054, Office Action dated Apr. 20, 2007, 4 pages.

U.S. Appl. No. 10/773,054, Office Action dated Sep. 19, 2007, 9 pages.

* cited by examiner

METHOD AND APPARATUS FOR COMMUNICATION IN THE PRESENCE OF IMPULSE NOISE

TECHNICAL FIELD

This disclosure relates generally to communication systems, and more particularly to multicarrier communication in the presence of periodic impulsive interference.

BACKGROUND

A Discrete Multi-Tone (DMT) communication system carries information from a transmitter to a receiver over a number of sub-carriers or tones. There are various sources of interference and noise in a DMT system that corrupt the information signal on each tone as it travels through the communication channel and is decoded at the receiver. Because of this signal corruption, the transmitted data may be retrieved erroneously by the receiver. In order to ensure a reliable communication between transmitter and receiver, each tone may carry a limited number of data bits. The number of data bits or the amount of information that a tone carries may vary from tone to tone and depends on the relative power of the information and the corrupting signals on that particular tone.

A reliable communication system is typically defined as a system in which the probability of an erroneously detected data bit by the receiver is always less than a target value. The aggregate sources of corruption associated with each tone are commonly modeled as a single noise source with Gaussian distribution that is added to the information signal on that tone. Under these assumptions, the signal-to-noise power ratio (SNR) becomes a significant factor in determining the maximum number of data bits a tone can carry reliably.

The direct relationship between SNR and the bit rate is based on the key assumption of Gaussian distribution for noise. However, this assumption is not completely valid in many practical situations. An important category of such cases is, for example, an environment with periodic impulsive interference from an AC power line. Electric motors and light dimmer switches are examples of such interfering sources. With such noise sources, SNR may not accurately determine the reliable bit rate.

BRIEF DESCRIPTION OF THE DRAWINGS

FIG. 1 illustrates examples of scatter plots and histograms of a normalized error signal for a particular tone in an ADSL modem when an interfering electric dimmer is off and on.

DETAILED DESCRIPTION

In the following detailed description of embodiments of the invention, reference is made to the accompanying drawings in which like references indicate similar elements, and in which, by way of illustration, specific embodiments in which the invention may be practiced are shown. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The interference from impulse noise sources tends to be periodically impulsive; i.e. strong corrupting power with short duration. Although the maximum instantaneous power of this type of noise is fairly high, the average power is rather low, resulting in a large peak-to-average ratio (PAR)—a salient characteristic of these interfering sources.

Figure 1:
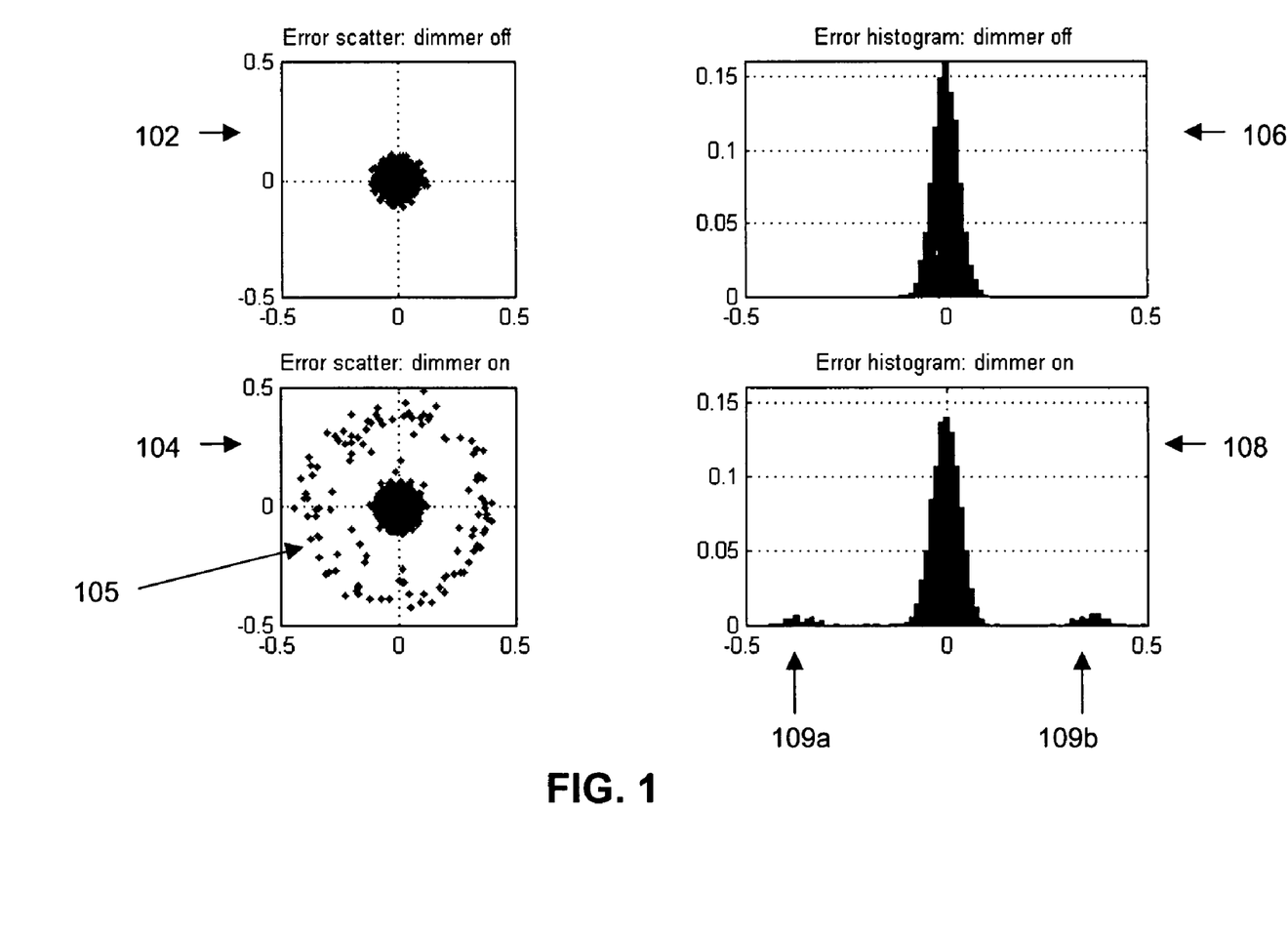

In an Asymmetric Digital Subscriber Line (ADSL) system, where each tone is modulated using a Quadrature Amplitude Modulation (QAM) scheme, the error between the receive and transmit signal is usually depicted in a 2D scatter plot for each tone. In such a plot, each point corresponds to a data point and represents the amplitude error of the in-phase and perpendicular components of the carrier. FIG. 1 illustrates examples of such scatter plots 102, 104, along with histograms 106, 108 of the normalized error signal for a particular tone in a conventional ADSL modem when an interfering electric dimmer is off and on. The histogram 106 of the error when the dimmer is off shows a Gaussian distribution for the noise source. When the dimmer is on, however, the histogram 108 shows side lobes 109a, 109b that correspond to the outliers 105 on the scatter plot 104.

Figure 2:
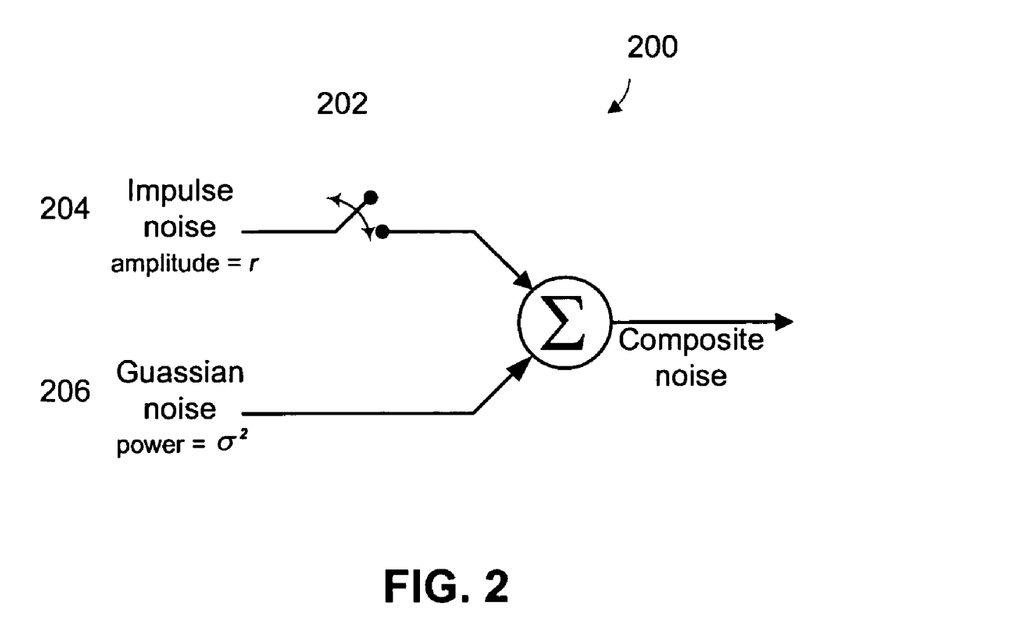
FIG. 2 illustrates an embodiment of a composite noise model consisting of impulse and Gaussian noise sources.

Clearly, a simple Gaussian distribution may not accurately model an impulse noise source. In one embodiment, a more accurate model is a composite noise model that includes an impulse noise source as an additive noise besides the original Gaussian noise source. FIG. 2 illustrates an embodiment of a composite noise model 200 consisting of impulse 204 and Gaussian 206 noise sources. The impulse noise 204, in its simplest form, has a uniformly distributed random phase and a constant amplitude called impulse amplitude, r. A switch 202 controls the contribution of the impulse noise source 204 to the composite model 200. The switch 202 turns on with a rate called impulse frequency and remains on for a period called impulse duration. An interfering electric dimmer, for example, has a fairly constant impulse frequency that is about twice the frequency of an AC power line. Embodiments of the methods and apparatuses described herein analyze the bit-error rate with a composite noise source and detect the presence of an impulse noise source.

Equivalent Noise Power

A bit-error occurs when the noise amplitude is large enough so that a received QAM constellation point crosses the so-called decision boundary and is decoded as a neighboring point. The decision boundaries normally cross midway between the adjacent constellation points. For a Gaussian noise source, the ratio of the minimum-distance of constellation points to the power level of noise determines the bit-error rate. For a fixed power level of noise, the higher the minimum distance is, the lower the probability of error is. When maintaining a target error rate for a given power level of noise, the constellation size may be chosen such that its minimum-distance is above:

$$d_G = \alpha \sigma \quad (1)$$

where $d_G$ denotes the minimum-distance when the noise source is purely Gaussian, $\sigma^2$ is the power of the Gaussian noise source, and $\alpha$ is a constant factor that depends significantly on the error rate and the channel coding scheme. For example, in one embodiment, for an uncoded modulation with a target bit-error rate of $10^{-7}$, $\alpha$ has a value of about 6.0.

In one embodiment, to obtain a similar expression for impulse noise, the following three key assumptions may be made:

A.1—The impulse noise has a very small duty cycle; i.e. it only occurs infrequently and for very short periods.

A.2—The impulse noise frequency is much higher than the target error rate.

A.3—The impulse noise amplitude is much larger than the Gaussian noise power.

The first assumption, A.1, implies that the contribution of impulse noise to the average composite power level of noise is negligible. Therefore, the measured power level of noise is reasonably close to the Gaussian noise power. The last two assumptions, A.2 and A.3, imply that the outliers 105 in the scatter plot 104 of FIG. 1 dominate the error events. This is because the outliers are biased off-center and closer to the decision boundaries, and hence are more probable to pass a boundary and result in error. The average distance of outliers from the center of scatter plot equals the impulse amplitude, resulting in a minimum-distance, which is effectively smaller by twice that value. Therefore, in one embodiment, to maintain a target error rate with an impulsive noise, the minimum-distance is $$d_I = \alpha\sigma + 2r \quad (2)$$

where $r$ is the impulse amplitude and $d_I$ denotes the minimum-distance with an impulse noise source.

In one embodiment, it is useful to derive an equivalent pure Gaussian noise source that results in the same minimum-distance as a composite noise source. In one embodiment, using equations (1) and (2), the power of the equivalent noise source, $\sigma_e$, is derived as:

$$\sigma_e = \sigma\left(1 + \frac{2}{\alpha}\frac{r}{\sigma}\right). \quad (3)$$

Figure 3:
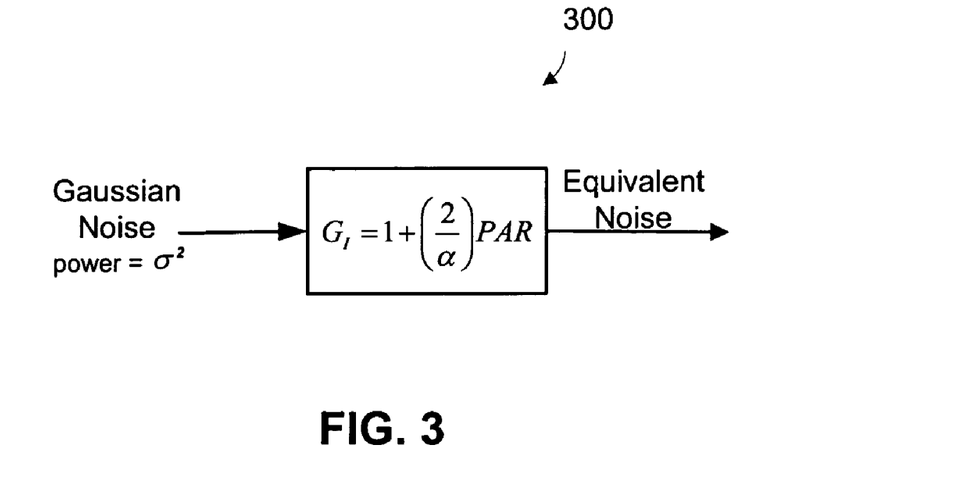
FIG. 3 illustrates an embodiment of an equivalent noise model of a composite noise source.

This indicates that for the purpose of bit-error rate analysis and bit-loading, a composite noise source is equivalent to a simple Gaussian noise source with an amplified power. Therefore, in one embodiment, the composite noise model 200 of FIG. 2 can be simplified as an equivalent Gaussian noise source illustrated in FIG. 3. FIG. 3 illustrates an equivalent noise model 300 in which the impulse noise effectively acts as an amplifier for the original Gaussian noise source with an equivalent gain, $G_1$, where $G_1 = 1 + (2/\alpha)(r/\sigma)$. In one embodiment, using assumption A.3, the impulse amplitude $r$ is obtained by measuring the maximum noise value over a finite time interval. Thus, in one embodiment, the ratio $r/\sigma$ is measured as the peak-to-average (PAR) ratio of the noise, and the equivalent gain (i.e. gain factor) of an impulse noise can be expressed as:

$$G_I = 1 + \left(\frac{2}{\alpha}\right) PAR. \quad (4)$$

It should be noted that the assumptions that led to the equivalent noise model 300 and the corresponding effective gain for impulse noise only hold when the PAR is large enough. When the PAR is small, the Gaussian noise is the dominant noise source and a simple Gaussian model is applicable. For example, in one embodiment, the expected value of PAR for a Guassian noise source measured over 1000 samples is about 3.0; with an impulse noise, the measured PAR may be above 4.0.

Impulse Noise Detection

Figure 4A:
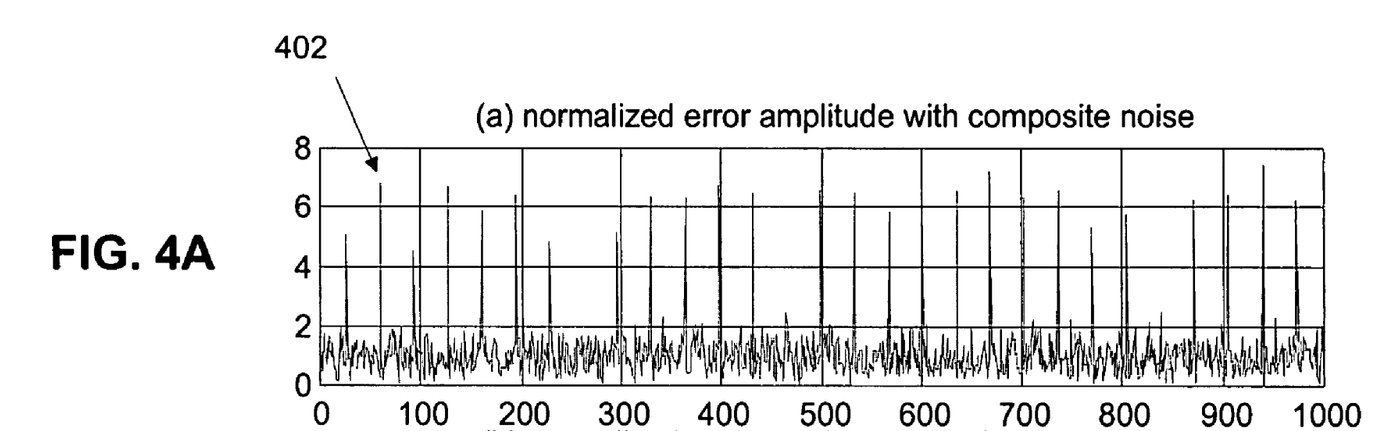
FIGS. 4A and 4B illustrate examples of time-domain plots for composite and Gaussian noise sources.
Figure 4B:
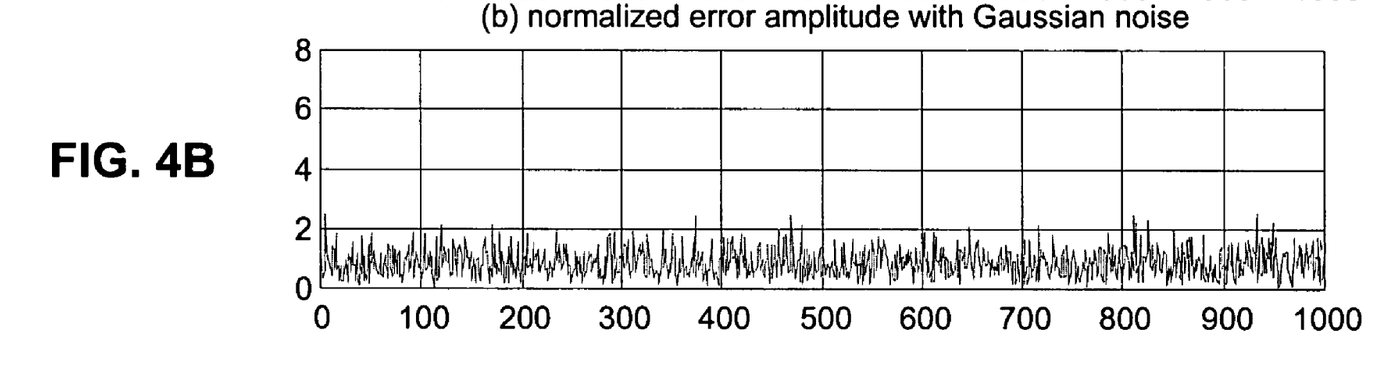

To apply the equivalent noise model 300 derived above, the presence of impulse noise must be detected. In one embodiment, a salient feature that is used to distinguish a composite noise from a pure Gaussian noise source is the higher rate of outliers 105 in the scatter plot 104, illustrated in FIG. 1. These outliers form the large error samples or spikes 402 in the time-domain plot illustrated in FIG. 4A. The error amplitude in the plots illustrated in FIGS. 4A and 4B is normalized to the standard deviation of the noise. An error sample is defined as a spike error if its normalized amplitude is above a preset spike threshold. FIG. 4B illustrates that the spike rate with a pure Gaussian noise source is much lower than that with a composite noise source, as illustrated in FIG. 4A.

The probability of a spike error for a Gaussian noise source can be derived from the so-called Complementary Error Function. This probability is calculated to be exceeding smaller as the spike threshold is set higher. For instance, in one embodiment, spike threshold values of 3, 4 and 5 result in spike rates of $2.7 \times 10^{-3}$, $6.3 \times 10^{-5}$ and $5.7 \times 10^{-7}$, respectively. On the other hand, the spike rate with an impulse noise source is much higher and fairly constant over a wide range of threshold values. For example, in one embodiment, an electric dimmer with AC power frequency of 60 Hz can generate a spike rate in the order of $3 \times 10^{-2}$ in an ADSL system where the sampling rate is about 4 KHz. In the example illustrated in FIG. 4A, this rate changes only slightly as the spike threshold varies from 3 to 5.

Figure 5:
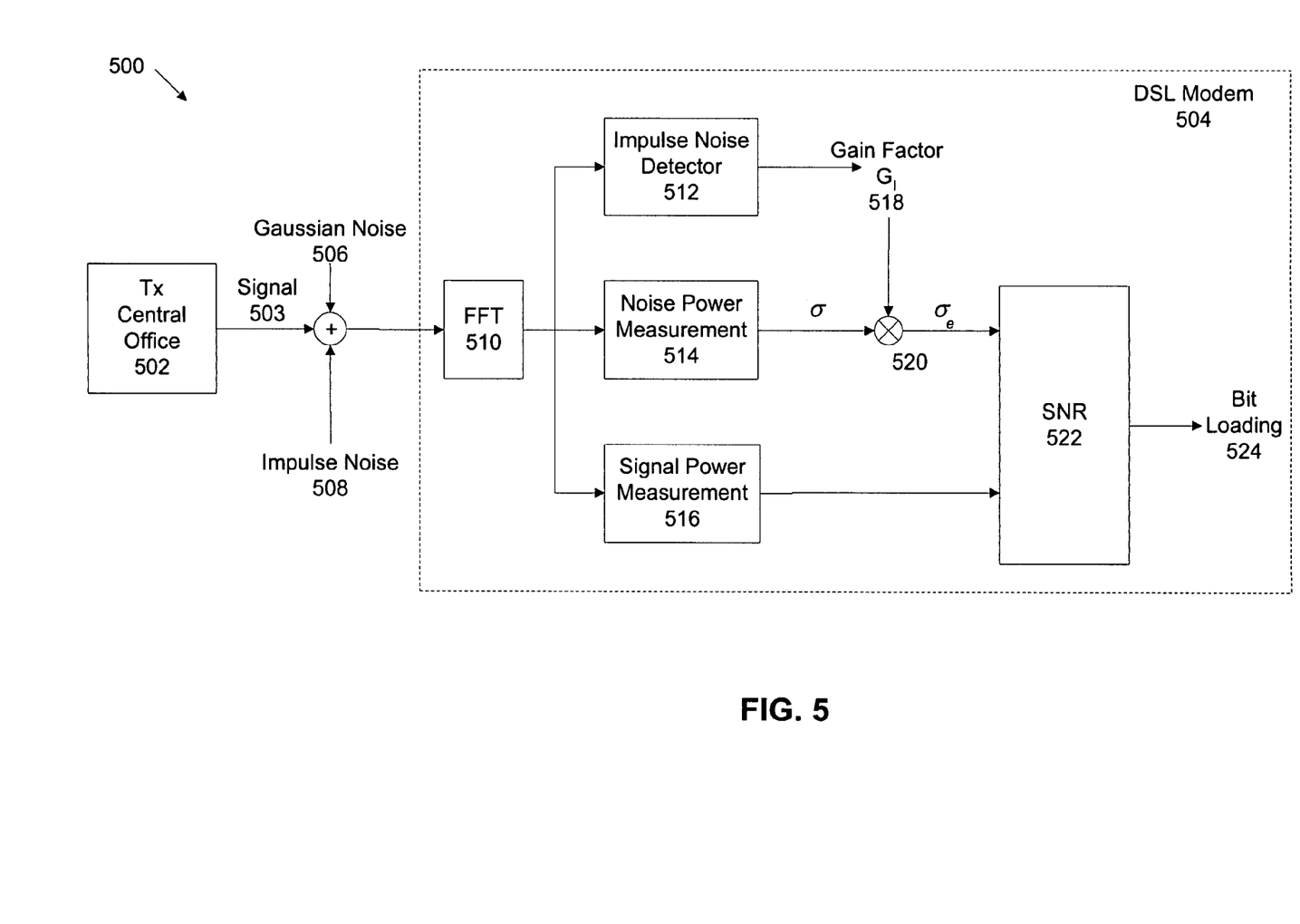
FIG. 5 illustrates an embodiment of a DMT communication system.

A system level overview of the operation of an embodiment of the invention is described with reference to FIG. 5. FIG. 5 illustrates an embodiment of a DMT communication system 500. A transmitter 502 at a central office transmits a multicarrier signal 503 (e.g. a DMT signal) to a receiver DSL modem 504. As the signal 503 travels to the modem 504 through a transmission channel (e.g. a telephone line), the signal is potentially corrupted by both Gaussian 506 and Impulse 508 noise sources. Once the signal 503 is received at the modem 504, a Fast Fourier Transform (FFT) block 510 transforms samples of the signal from the time-domain to the frequency-domain, such that a stream of data for each sub-carrier may be output. In one embodiment, processing of each sub-carrier may be performed in parallel or in serial.

For a particular sub-carrier of the multicarrier signal, a Noise Power Measurement block 514 measures the power level of noise for the sub-carrier. An Impulse Noise Detector 512 detects whether an impulse noise source is present in the sub-carrier signal. If impulse noise is detected in the sub-carrier, detector 512 determines a Gain Factor $G_1$ 518 associated with the impulse noise. The gain factor 518 is multiplied 520 with the power level of noise for the sub-carrier to obtain an equivalent noise power. The equivalent noise power is input into a Signal-to-Noise Ratio (SNR) block 522.

A Signal Power Measurement block 516 measures the signal power for the sub-carrier, and inputs the result into the SNR block 522. The SNR block determines a signal-to-noise ratio, which is used to determine bit loading 524 for the sub-carrier. The particular methods used in the system 500 are described below with respect to a series of flow charts.

Noise Power Measurement in ADSL

Figure 6:
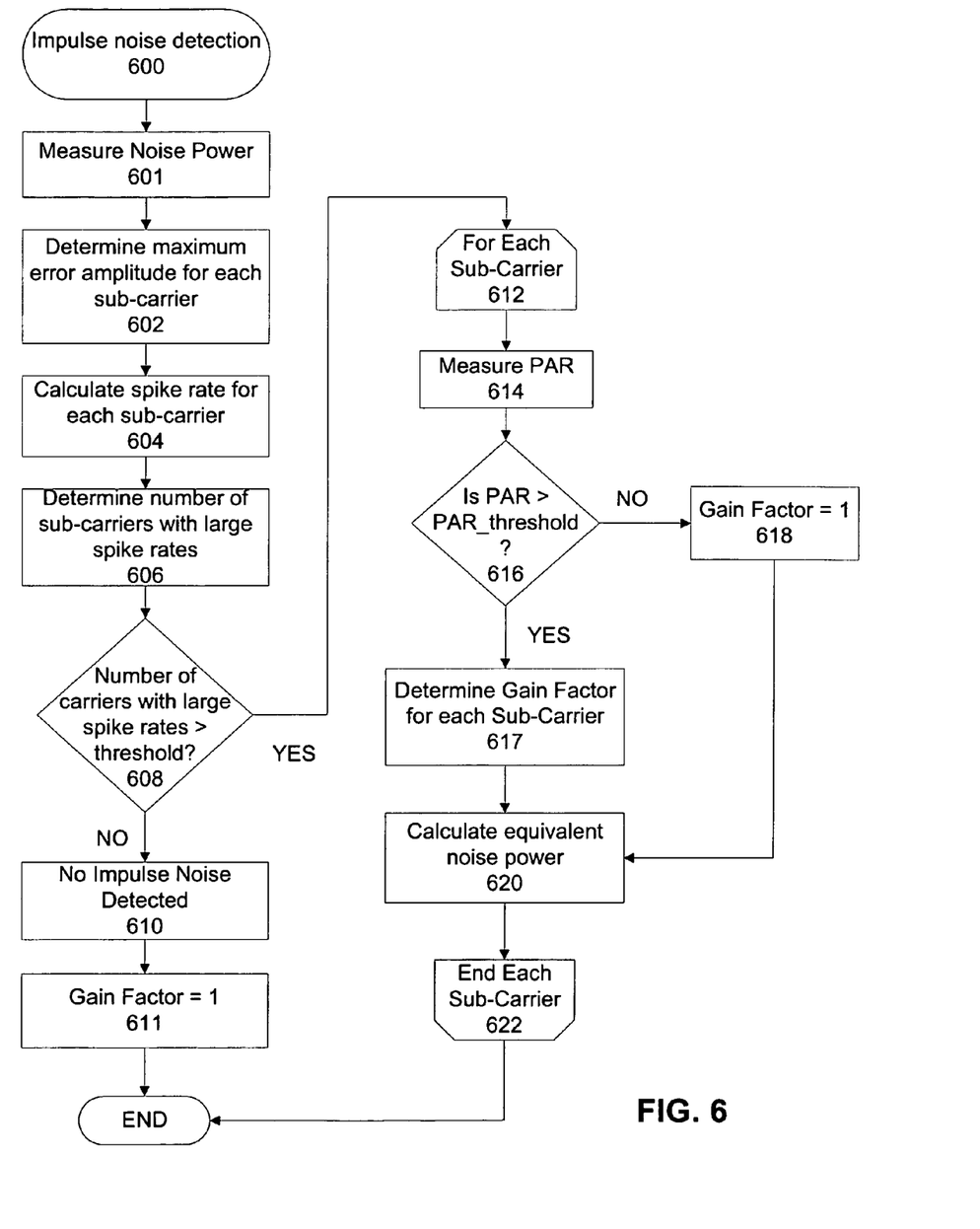
FIG. 6 illustrates an embodiment of an impulse noise detection method.

In one embodiment, the present invention provides for the automatic detection of an impulse noise source and calculation of the equivalent noise power in a DMT communication system. FIG. 6 illustrates an embodiment of an impulse noise detection method 600, which may be implemented in the system 500 illustrated in FIG. 5. For example, in one embodiment, the method 600 is implemented in the impulse noise detector 512 and noise power measurement block 514 of FIG. 5.

The method 600 illustrated in FIG. 6 constitutes a computer program made up of computer-executable instructions illustrated as blocks (acts) from 600 until 622. Describing the method by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIG. 6 without departing from the scope of the invention and that no particular order is implied by the arrangement of blocks shown and described herein.

In one embodiment, the noise source is detected by the method 600 and labeled as impulsive based on the aggregate data from all sub-carriers. If the noise source is detected as impulsive, then the method 600 calculates the effective impulse gain and equivalent noise source for each sub-carrier independently. In another embodiment, an impulse noise detection method calculates a single impulse gain to be applied to all sub-carriers of the signal. In one embodiment, processing of each sub-carrier may be performed in parallel or in serial.

In one embodiment, at block 601, the method 600 measures the power level of noise for each sub-carrier. In one embodiment, error samples, $e_i$, are measured over a finite time interval of n samples for each sub-carrier. The noise power measurement is updated regularly after a new set of error samples are collected. In one embodiment, the sampling rate is about 4 KHz in an ADSL system. For each sub-carrier, the method 600 calculates the standard deviation or the RMS value of the error samples as:

$$\sigma^2 = \frac{1}{n}\sum_{i=1}^{n} e_i^2, \qquad (5)$$

where $\sigma^2$ is the power of the Gaussian noise source for a particular sub-carrier.

At block 602, the method 600 determines the maximum error amplitude for each sub-carrier of the signal. For each sub-carrier, the method 600 calculates the maximum error amplitude, m, as:

$$m = \text{MAX}(|e_i|) \qquad (6).$$

At block 604, for each sub-carrier, the method 600 calculates the spike rate, s, as:

$$s = \frac{1}{n}\text{ number of } (|e_i| > \text{spike\_threshold}). \qquad (7)$$

In one embodiment, a spike is an error having a normalized error amplitude above a spike threshold. For example, in one embodiment, the spike threshold is about 4.5.

At block 606, the method 600 calculates the number of carriers with large spike rates as:

large_rate_carriers=number of carriers with
(s>rate_threshold)  (8).

In one embodiment, a large spike rate is a spike rate, s, above a rate threshold. For example, in one embodiment, the rate threshold is about 0.3. The rate threshold depends on the specifics of a particular implementation.

At block 608, the method 600 determines whether the number of carriers with large spike rates is greater than a carrier threshold (i.e. whether larger_rate_carriers>carrier_threshold). In one embodiment, the carrier threshold is about 10% of the total number of carriers. If the number of carriers with large spike rates is not greater than a carrier threshold, then no impulse noise is detected by the method 600 at block 610. In one embodiment, if no impulse noise is detected by the method 600 at block 608, the gain factor $G_1$ is set to $G_1=1$ for all sub-carriers, and the method 600 ends. In another embodiment, where no impulse noise is detected by the method 600 at block 608, no gain factor is determined, and the original noise power measurement for all sub-carriers is not modified.

In one embodiment, if the number of carriers with large spike rates is determined by the method 600 at block 608 to be greater than the carrier threshold, the method 600 performs the acts represented by blocks 612 to 622 for each sub-carrier of the signal. In one embodiment, processing of each sub-carrier may be performed in parallel or in serial. At block 614, the method 600 measures the peak-to-average ratio for each sub-carrier as:

$$PAR = \frac{m}{\sigma}, \qquad (9)$$

where m is the maximum error amplitude and $\sigma^2$ is the power of the Gaussian noise source for a particular sub-carrier.

For each sub-carrier, the method 600 determines at block 616 whether the PAR for the particular sub-carrier is greater than a PAR threshold (i.e. whether PAR>PAR_threshold). In one embodiment, the PAR threshold is about 4.5. In another embodiment, each sub-carrier has a specific PAR threshold. If the method 600 determines at block 616 that the PAR for the particular sub-carrier is not greater than a PAR threshold, the gain factor $G_1$ is set to $G_1=1$ at block 618. If the method 600 determines at block 616 that the PAR for the particular sub-carrier is greater than a PAR threshold, then the method 600 determines a gain factor $G_1$ for the particular sub-carrier at block 617. In one embodiment, the gain factor $G_1$ is determined as described above with respect to Equation (4).

At block 620, the method 600 calculates the equivalent noise power for the particular sub-carrier by multiplying the gain factor $G_1$ by the power of the Gaussian noise source measured by the method 600 at block 601. In one embodiment, the power of the equivalent noise source $\sigma_e$ for the particular sub-carrier is calculated as:

$$\sigma_e = \sigma\left(1 + \frac{2}{\alpha}PAR\right). \quad (10)$$

The final value of equivalent noise power, $\sigma_e^2$, can be used in any bit-loading algorithm that is designed specifically for Gaussian noise sources. For example, in one embodiment, the equivalent noise power calculated by the method 600 is used to determine the SNR for the sub-carrier. Subsequently, the SNR based on the equivalent noise power is used to determine a bit-loading for the sub-carrier in the presence of impulse noise. The resulting bit-error rate remains at target value even if the noise source is not purely Gaussian and consists of an impulsive component.

In one embodiment, the method 600 is implemented more robustly by introducing hysterisis when a comparison with a threshold is made. This minimizes the frequent switching of the gain factor on and off once impulse noise is detected for a certain tone. In one embodiment, this aspect is implemented by using a different threshold once impulse noise is detected for a particular sub-carrier. In one embodiment, this is accomplished using variations of the spike threshold or the rate threshold. For example, in one embodiment, initially a higher spike threshold may be used to initially detect an impulse noise source. However, once an impulse noise source is detected, a lower spike threshold is used to detect the impulse noise source. This may be similarly implemented with the rate threshold. The result is a better user experience, since fluctuation between impulse noise compensation and non-compensation is minimized.

Although embodiments of the present invention are described primarily with respect to the detection and compensation for impulsive noise sources, it will be appreciated that embodiments of the present invention may be applied to compensate for other types of non-Gaussian noise sources. For example, phase noise, a type of non-Gaussian noise, may be compensated for by determining a gain factor associated with the phase noise, and applying the gain factor to determine an equivalent noise power.

Furthermore, although embodiments of the present invention are described primarily with respect to ADSL systems using DMT modulation, it will be appreciated that embodiments of the present invention are not limited thereto. For example, embodiments of the present invention are applicable to other versions of DSL, such as, but not limited to, Rate Adaptive DSL (RADSL), Very High Bit Rate DSL (VDSL or VHDSL), High Bit Rate DSL (HDSL), Symmetric DSL (SDSL), and ISDN DSL (IDSL), as well as communications systems using other modulation techniques. Embodiments of the present invention are applicable to communication systems employing carrier signals in general. For example, in a single carrier system, impulse noise may be detected and compensated for by modeling the impulsive noise as described above, and generating a gain factor associated with the impulsive noise source.

Figure 7:
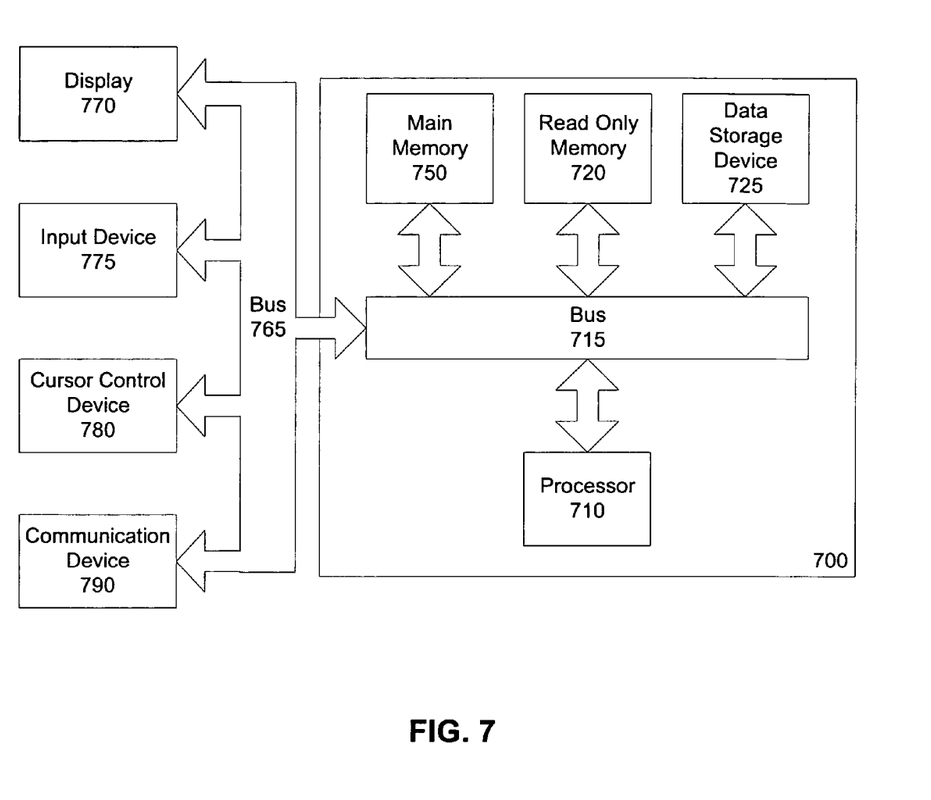
FIG. 7 illustrates an embodiment of a computer system suitable for use in practicing the present invention.

FIG. 7 is one embodiment of a computer system that may be used with embodiments of the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, a wireless connection mechanism, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to limit the invention to the precise forms or embodiments disclosed. While specific embodiments of, and examples for, the invention are described herein for illustrative purposes, various equivalent modifications are possible within the scope of the invention, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   determining a power level of Gaussian noise in a signal;
   detecting whether impulse noise is in the signal;
   determining a gain factor associated with the impulse noise; and
   applying the gain factor to the power level of Gaussian noise in the signal to calculate an equivalent composite noise power, wherein composite noise includes Gaussian noise and impulse noise.

2. The method of claim 1, further comprising:
   determining a signal-to-noise ratio based on a signal power of the signal and the equivalent composite noise power.

3. The method of claim 2, wherein the signal is a multicarrier signal including a plurality of sub-carriers.

4. The method of claim 3, wherein the impulse noise in the signal is detected based on data from the plurality of sub-carriers.

5. The method of claim 3, wherein detecting whether the impulse noise is in the signal comprises, for each sub-carrier:
   determining a maximum error amplitude (m); and
   determining a spike rate.

6. The method of claim 5, wherein detecting whether impulse noise is in the signal further comprises:
   determining a number of sub-carriers, (c), where the spike rate is greater than a rate threshold;
   if c is greater than a carrier threshold, for each sub-carrier, calculating a peak-to-average ratio, PAR, as $$PAR = \frac{m}{\sigma},$$

where $\sigma^2$ is the noise power of the sub-carrier; and
   for each sub-carrier, if the PAR is greater than a PAR threshold, calculating the gain factor, $G_1$ as:

$$G_I = 1 + \left(\frac{2}{\alpha}\right)PAR,$$

where $\alpha$ is a constant factor based on an error rate and a sub-carrier coding scheme.

7. The method of claim 6, wherein the equivalent composite noise power $\sigma_e$ for a sub-carrier is calculated as $\sigma_e = \sigma G_I$.

8. The method of claim 5, wherein determining a spike rate for a sub-carrier comprises determining a number of error samples above a predetermined spike threshold.

9. The method of claim 8, further comprising lowering the spike threshold if impulse noise is detected in the signal.

10. The method of claim 6, further comprising lowering the rate threshold if impulse noise is detected in the signal.

11. The method of claim 2, further comprising determining bit-loading based on the signal-to-noise ratio.

12. The method of claim 3, further comprising if impulse noise is detected in the signal:
   determining a gain factor and an equivalent composite noise power for a first sub-carrier; and
   determining a gain factor and an equivalent composite noise power for a second sub-carrier.

13. A method comprising:
   determining a power level of Gaussian noise in a signal;
   detecting whether non-Gaussian noise is in the signal;
   determining a gain factor associated with the non-Gaussian noise; and
   applying the gain factor to the power level of the Gaussian noise in the signal to calculate an equivalent composite noise power, wherein composite noise includes Gaussian noise and non-Gaussian noise.

14. The method of claim 13, further comprising:
   determining a signal power of the signal; and
   determining a signal-to-noise ratio based on the signal power of the signal and the equivalent composite noise power.

15. The method of claim 14, wherein the signal is a multi-carrier signal including a plurality of sub-carriers.

16. A machine-readable medium storing executable instructions to a cause a device to perform a method comprising:
   determining a power level of Gaussian noise in a signal;
   detecting whether impulse noise is in the signal;
   determining a gain factor associated with the impulse noise; and
   applying the gain factor to the power level of Gaussian noise in the signal to calculate an equivalent composite noise power, wherein composite noise includes Gaussian noise and impulse noise.

17. The machine-readable medium of claim 16, wherein the method further comprises:
   determining a signal-to-noise ratio based on a signal power of the signal and the equivalent composite noise power.

18. The machine-readable medium of claim 17, wherein the signal is a multicarrier signal including a plurality of sub-carriers.

19. The machine-readable medium of claim 18, wherein the impulse noise in the signal is detected based on data from the plurality of sub-carriers.

20. The machine-readable medium of claim 18, wherein detecting whether the impulse noise is in the signal comprises, for each sub-carrier:
   determining a maximum error amplitude (m); and
   determining a spike rate.

21. The machine-readable medium of claim 20, wherein detecting whether impulse noise is in the signal further comprises:
   determining a number of sub-carriers, (c), where the spike rate is greater than a rate threshold;
   if c is greater than a carrier threshold, for each sub-carrier, calculating a peak-to-average ratio, PAR, as $$PAR = \frac{m}{\sigma},$$

where $\sigma^2$ is the noise power of the sub-carrier; and
   for each sub-carrier, if the PAR is greater than a PAR threshold, calculating the gain factor, $G_1$ as:

$$G_I = 1 + \left(\frac{2}{\alpha}\right) PAR,$$

where $\alpha$ is a constant factor based on an error rate and a sub-carrier coding scheme.

22. The machine-readable medium of claim 21, wherein the equivalent composite noise power $\sigma_e$ for a sub-carrier is calculated as $\sigma_e = \sigma G_1$.

23. The machine-readable medium of claim 20, wherein determining a spike rate for a sub-carrier comprises determining a number of error samples above a predetermined spike threshold.

24. The machine-readable medium of claim 23, wherein the method further comprises lowering the spike threshold if impulse noise is detected in the signal.

25. The machine-readable medium of claim 21, wherein the method further comprises lowering the rate threshold if impulse noise is detected in the signal.

26. The machine-readable medium of claim 17, wherein the method further comprises determining bit-loading based on the signal-to-noise ratio.

27. The machine-readable medium of claim 18, wherein the method further comprises, if impulse noise is detected in the signal:
   determining a gain factor and an equivalent composite noise power for a first sub-carrier; and
   determining a gain factor and an equivalent composite noise power for a second sub-carrier.

28. A machine-readable medium storing executable instructions to a cause a device to perform a method comprising:
   determining a power level of Gaussian noise in a signal;
   detecting whether non-Gaussian noise is in the signal;
   determining a gain factor associated with the non-Gaussian noise; and
   applying the gain factor to the power level of the Gaussian noise in the signal to calculate an equivalent composite noise power, wherein composite noise includes Gaussian noise and non-Gaussian noise.

29. The machine-readable medium of claim 28, wherein the method further comprises:
   determining a signal power of the signal; and
   determining a signal-to-noise ratio based on the signal power of the signal and the equivalent composite noise power.

30. The machine-readable medium of claim 29, wherein the signal is a multicarrier signal including a plurality of sub-carriers.

31. An apparatus comprising:
   means for determining a power level of Gaussian noise in a signal;
   means for detecting whether impulse noise is in the signal;
   means for determining a gain factor associated with the impulse noise; and
   means for applying the gain factor to the power level of Gaussian noise in the signal to calculate an equivalent composite noise power, wherein composite noise includes Gaussian noise and impulse noise.

32. The apparatus of claim 31, further comprising:
   means for determining a signal-to-noise ratio based on a signal power of the signal and the equivalent composite noise power.

33. The apparatus of claim 32, wherein the signal is a multicarrier signal including a plurality of sub-carriers.

34. The apparatus of claim 33, wherein the impulse noise in the signal is detected based on data from the plurality of sub-carriers.

35. The apparatus of claim 33, wherein the means for detecting whether the impulse noise is in the signal comprises, for each sub-carrier:
   means for determining a maximum error amplitude (m); and
   means for determining a spike rate.

36. The apparatus of claim 35, wherein the means for detecting whether impulse noise is in the signal further comprises:
   means for determining a number of sub-carriers, (c), where the spike rate is greater than a rate threshold;
   if c is greater than a carrier threshold, for each sub-carrier, means for calculating a peak-to-average ratio, PAR, as $$PAR = \frac{m}{\sigma},$$

where $\sigma^2$ is the noise power of the sub-carrier; and
   for each sub-carrier, if the PAR is greater than a PAR threshold, means for calculating the gain factor, $G_1$ as:

$$G_I = 1 + \left(\frac{2}{\alpha}\right) PAR,$$

where $\alpha$ is a constant factor based on an error rate and a sub-carrier coding scheme.

37. The apparatus of claim 36, wherein the equivalent composite noise power $\sigma_e$ for a sub-carrier is calculated as $\sigma_e = \sigma G_1$.

38. The apparatus of claim 35, wherein the means for determining a spike rate for a sub-carrier comprises means for determining a number of error samples above a predetermined spike threshold.

39. The apparatus of claim 38, further comprising means for lowering the spike threshold if impulse noise is detected in the signal.

40. The apparatus of claim 36, further comprising means for lowering the rate threshold if impulse noise is detected in the signal.

41. The apparatus of claim 32, further comprising means for determining bit-loading based on the signal-to-noise ratio.

42. The apparatus of claim 33, further comprising if impulse noise is detected in the signal:
   means for determining a gain factor and an equivalent composite noise power for a first sub-carrier; and
   means for determining the gain factor and the equivalent composite noise power for a second sub-carrier.

43. An apparatus comprising:
   means for determining a power level of Gaussian noise in a signal;
   means for detecting whether non-Gaussian noise is in the signal;
   means for determining a gain factor associated with the non-Gaussian noise; and
   means for applying the gain factor to the power level of the Gaussian noise in the signal to calculate an equivalent composite noise power, wherein composite noise includes Gaussian noise and non-Gaussian noise.

44. The apparatus of claim 43, further comprising:
   means for determining a signal power of the signal; and
   means for determining a signal-to-noise ratio based on the signal power of the signal and the equivalent composite noise power.

45. The apparatus of claim 44, wherein the signal is a multicarrier signal including a plurality of sub-carriers.

* * * * *